Nov. 5, 1963 F. E. SEESTROM 3,109,944

POSITIVE BLANKING CIRCUIT WITH ISOLATION CAPACITOR TO PREVENT INPUT OVERLOAD

Filed April 7, 1961 3 Sheets-Sheet 1

INVENTOR.
FRANK E. SEESTROM
BY Moody and Phillips
ATTORNEYS

Nov. 5, 1963 F. E. SEESTROM 3,109,944

POSITIVE BLANKING CIRCUIT WITH ISOLATION CAPACITOR TO PREVENT INPUT OVERLOAD

Filed April 7, 1961 3 Sheets-Sheet 2

INVENTOR.
FRANK E. SEESTROM
BY Moody and Pellion
ATTORNEYS

INVENTOR.
FRANK E. SEESTROM
BY Moody and Phillips
ATTORNEYS 3,109,944
Patented Nov. 5, 1963

3,109,944

POSITIVE BLANKING CIRCUIT WITH ISOLATION CAPACITOR TO PREVENT INPUT OVERLOAD

Frank E. Seestrom, Dallas, Tex., assignor to Collins Radio Company, Cedar Rapids, Iowa, a corporation of Iowa Filed Apr. 7, 1961, Ser. No. 101,477
6 Claims. (Cl. 307—88.5)

This invention relates generally to an improved means for switching the level of a relatively large D.C. voltage at D.C. switching rates with no D.C. coupling between the switching signal and the high voltage and, more particularly, the invention relates to a substantially distortionless D.C. voltage switching circuit means which finds particular use in the blanking of a cathode ray tube in which the cathode and the control grid of the cathode ray tube are maintained at relatively large negative potentials with respect to ground potential.

There are in the prior art certain situations in which it is desirable to be able to switch the level of a relatively high voltage from a first magnitude to a second magnitude. One particular such situation arises in connection with the voltages which are employed in cathode ray tubes. In many standard electrostatic cathode ray tubes the beam deflection plates are maintained at D.C. potential which is quite close to the D.C. potential of the main anode. The potential of the cathode, of course, is quite negative with respect to the main anode and the potential of the control grid is a little more negative than the cathode. In many applications of cathode ray tubes employing electrostatic deflection, it is required that the output of the deflection signal amplifier be coupled directly to the deflection plates because of the D.C. nature of the signal supplied to said deflection plates. Such direct coupling, however, results in the potential of the deflection plates and the main anode of being somewhere near ground potential and the potential of the cathode and the control grid, consequently, being negative with respect to ground potential, by an amount substantially equal to the main anode to cathode voltage. In the prior art, such negative voltages for the control grid and the cathode have been supplied by tapping a voltage divider connected across the voltage source. Blanking of the cathode ray tube (C.R.T.) usually is accomplished by feeding a blanking signal to the control grid through a coupling capacitor. However, in case where the ratio of the blanked to the unblanked time is changing, or is otherwise irregular, the coupling capacitor is charged or discharged in varying amounts due to the different time intervals involved. Thus, distortion is introduced into the signal. In such instances direct coupling of the blanking signal is desirable. It is to be understood that the invention described herein may be employed in applications other than with a cathode ray tube. More specifically, the invention may be employed in any application where it is desired to switch the magnitude of a relatively high D.C. voltage from one level to another level without employing a D.C. coupling and without introducing distortion into the switching signal which might be caused by the coupling capacitor and its attendant RC time constant.

Consequently, the principal object of the present invention is to provide a circuit means capable of substantially distortionless switching of the magnitude of a relatively high voltage from one level to another level without employing D.C. coupling means.

It is a further object of the present invention to provide direct coupling of a blanking signal to the control grid of a cathode ray tube.

Another purpose of the invention is to provide a circuit whereby a cathode ray tube can be gated on or off at a D.C. rate, with no D.C. coupling between the grid and the gating circuit.

A further object of the invention is the elimination of the necessity for an extremely well-filtered negative supply voltage for a cathode ray tube. As will be seen later, the entire circuit is free to float with any ripple that might exist.

A further aim of the invention is the improvement of blanking circuits for the cathode ray tube generally.

In accordance with the invention there is provided an oscillator and means for providing a gating signal to control the output of said oscillator. The output of said oscillator is coupled to a high level detector through a D.C. blocking capacitor. Means, such as a Schmitt trigger circuit for example, is constructed to be responsive to said detector to supply an output signal to a control grid of a cathode ray tube. Both the detector and the trigger circuit are permitted to float at a high voltage on one side of the D.C. blocking capacitor, thus eliminating the need for a well-filtered negative voltage supply.

In accordance with a feature of the invention, a D.C. blocking capacitor permits the passage of the output signal of the oscillator to the detector and thence to the trigger circuit, while at the same time preventing the high voltages employed in the detector and the trigger circuit from being supplied back to the oscillator circuit.

The above-mentioned and other objects and features of the invention will be fully understood from the following detailed description thereof, when read in conjunction with the drawings in which.

Figure 1:
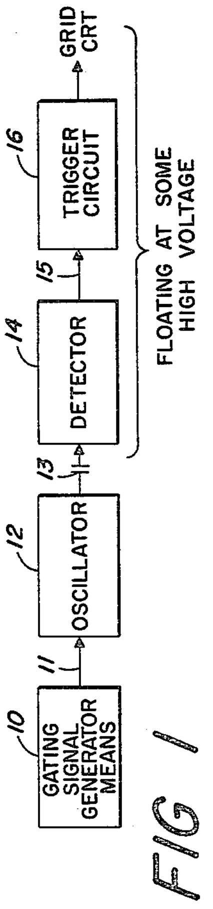
FIG. 1 shows a block diagram of the invention.

Referring now to the structure of FIG. 1, gating signal generator means 10 functions to supply to oscillator 12 via output lead 11 a signal which varies in accordance with some predetermined desired function. The oscillator 12 is gated on and gated off by such signal in accordance with the said predetermined function. The output of the oscillator 12 is supplied through coupling capacitor 13 to the detector 14, which functions to detect the output of the oscillator and convert it to D.C. voltage. Such D.C. voltage appears on output terminal 15 and is employed to energize a trigger circuit 16, which may be a trigger circuit of the Schmitt type. Due to the presence of the capacitor 13, the detector 14 and the trigger circuit 16 can be operated at high negative D.C. voltages. Such negative D.C. voltages are prevented from being supplied back to the oscillator 12 or the gating signal generator 10 because of the blocking capacitor 13. On the other hand, however, the capacitor 13 functions to pass freely the output signal of oscillator 12 to the detector 14; said oscillator output signal being in effect a control signal which, after detection, functions to operate the trigger circuit 16, as described in detail below.

Figure 2:
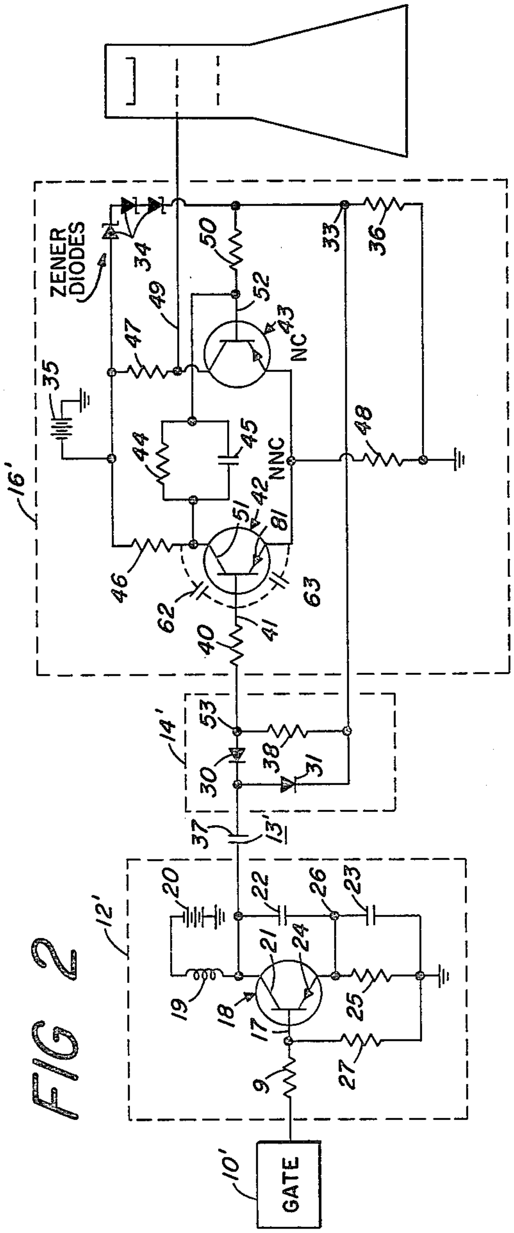
FIG. 2 shows a schematic sketch of the invention.

Referring now to structure of FIG. 2, the schematic diagram shown therein is broken down into various sections enclosed in broken line blocks which correspond to the various blocks shown in FIG. 1. Each block of FIG. 2 has the same reference character as its counterpart in FIG. 1, although primed. The signal from the gating signal means 10′ is supplied through limiting resistor 9 to the base 17 of transistor 18. The inductor 19, which connects negative battery source 20 to the collector electrode 21, and the capacitors 22 and 23 form a tuned circuit. A portion of the signal resonating in said tuned circuit is supplied back to the emitter 24 across emitter resistor 25 from point 26 so that oscillation is maintained in the circuit. The resistor 27 functions as a base return-to-ground resistor to prevent burning out of the transistor in the event that all input voltages are removed from the base electrode 17. Of course, if all input voltages are removed from the base 17 the transistor will become nonconductive and oscillation will cease. However, as long as a negative signal is supplied from the gate generating means 10′, transistor 18 will be conductive and the circuit in the block 12′ will function as an oscillator. When the gating signal from generating means 10′ terminates, the transistor 18 will become nonconductive and the oscillator 12′ will cease its oscillation.

While oscillator 12′ is in its energized state the output signal thereof will be supplied from the collector electrode 21 through the coupling capacitor 13′ (also referred to herein as a blocking capacitor) to the detector 14′. The detector 14′ is comprised of diodes 30 and 31, which are contained in parallel paths and which are oppositely poled with respect to the oscillator 12′.

The operation of the diodes 30 and 31 will now be discussed in detail so that their function in the invention will be more clearly understood. The positive half cycle portions of the signal supplied from the oscillator 12′ and passing through the capacitor 13′ will see a high impedance through diode 30, but will see a low impedance through diode 31. Consequently, these positive half cycles of the signal will flow through diode 31 to junction 33, Zener diodes 34, and to negative battery 35. It should be noted at this point that the Zener diodes 34 are broken down due to the fact that they have a large back voltage impressed thereacross in a circuit which may be traced from negative battery source 35 through the Zener diodes 34, resistor 36 to ground potential. Assume, for purposes of discussion, that the particular Zener diodes selected are ones that maintain a total potential drop of 50 volts thereacross. Further, assume that the battery source 35 is a —1000 volts. Thus, the potential at the junction 33 will always be —950 volts since the voltage drop across the Zener diodes 34 is substantially constant at 50 volts.

Thus, it can be seen that during the positive half portions of the signal flowing through the capacitor 13′ a negative charge will be built up on the right-hand plate 37 of the capacitor 13′. On the other hand, during each negative half cycle of the signal supplied through capacitor 13′, the diode 31 will present the high impedance thereto, but the diode 30 will present the low impedance thereto. However, due to the resistor 38 the current flowing through the diode 30 during the negative half cycles will be much less than the current flowing through the diode 31 during the positive half cycles of the supplied signal. Therefore, the positive charge accumulated on the plate 37 of the capacitor 13′ during the negative half cycles will be considerably less than the negative charge accumulated during the positive half cycles, with the over-all result that the plate 37 of the capacitor 13′ will accumulate a negative charge thereon. Such negative charge (or negative voltage) is impressed on the base 41 of transistor 42 through current limiting resistor 40; the transistor 42 forming a part of the Schmitt type trigger circuit.

The aforementioned Schmitt type trigger circuit comprises, in addition to transistor 42, transistor 43, a coupling circuit comprised of resistor 44 and speed-up capacitor 45, collector circuit resistors 46 and 47, a common emitter resistor 48, and an output lead 49, which output lead may be connected to the control grid of the cathode ray tube being controlled. The resistor 50 is a current limiting resistor.

In the operation of the Schmitt trigger circuit 16′, the transistor 43 is normally conductive and transistor 42 normally nonconductive in the absence of the output signal from the oscillator 12. Such normal condition is brought about in the following manner. The collector 51 of transistor 42 is connected through the resistor 44 to the base 52 of transistor 43. Thus, the base of transistor 43, under static conditions and in the absence of negative signals supplied to the base 41 of transistor 42, will tend to assume the same potential as the collector electrode 51 of transistor 42. Since said potential of collector 51 is negative with respect to that of the emitter electrodes and since PNP type transistors are used in the circuit, it follows that transistor 43 will become conductive.

However, when the oscillator 12 is energized and a negative signal is supplied to the base electrode 41, the transistor 42 becomes conductive, thus causing the potential of the collector electrode 51 to go in a positive direction. Such positive increase in the potential of the collector 51 will be supplied through the capacitor 45 to the base 52 of transistor 43 and will cause said transistor 43 to become nonconductive. Such a state of nonconductivity will exist in the transistor 43 only for as long a period as the transistor 42 is conductive.

Figure 3:
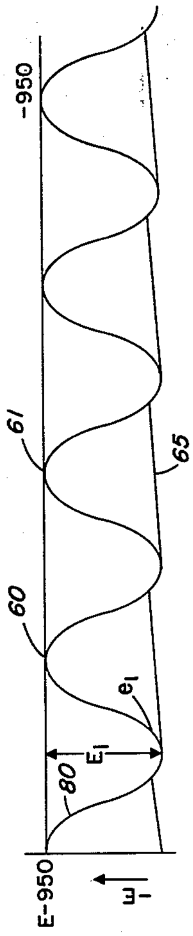
FIG. 3 shows curves of voltages which occur at various points in the circuit of FIG. 2 during operation thereof.

The signal appearing at the point 53 has (in the absence of filtering means) a waveform shown by the curve 80 of FIG. 3 with a maximum voltage of —950 volts which is equal to and determined by the potential of the junction 33, and a minimum voltage equal to —950 volts less the peak-to-peak amplitude $E_1$ of the signal $e_1$ supplied through the capacitor 13′. It will be apparent that, in the absence of a filtering capacitance, the signal appearing at point 53 would rise to a —950 volts once each complete cycle of the supplied signal $e_1$, as indicated at points 60 and 61. At and around these peak potentials 60 and 61 the transistor 43 would become conductive and the transistor 42 would become nonconductive. Such a state of conductivity and nonconductivity at the points 60 and 61 is an undesirable result which is avoided by means of the stray capacitance which exists between the base electrode 41 and the collector electrode 51, as represented by dotted capacitor 62, and the stray capacitance between the base electrode 40 and the emitter electrode 81, as represented by dotted capacitor 63. When the transistor 42 first begins to become conductive, the interelectrode capacitance 63 is utilized as a filtering capacitance since at the beginning of conductivity of the transistor 42 it (the interelectrode capacitance 63) is much larged than the interelectrode capacitance 62. However, after conductivity has been well established in the transistor 42, the interelectrode capacitance 63 decreases considerably so that the interelectrode capacitance 62 becomes the larger of the two and provides the filtering action required. Referring again to FIG. 3, the filtering action of capacitors 62 and 63, in conjunction with the resistive elements of the circuits, function to remove much of the A.C. component of the signal appearing at point 53 so that the actual signal supplied to the base electrode 41 is substantially D.C. and may be represented generally by the waveform 65 of FIG. 3. It can thus be seen that the diodes 30 and 31 in conjunction with capacitors 62 and 63 and the resistances involved function substantially as a peak detector.

Figure 4:
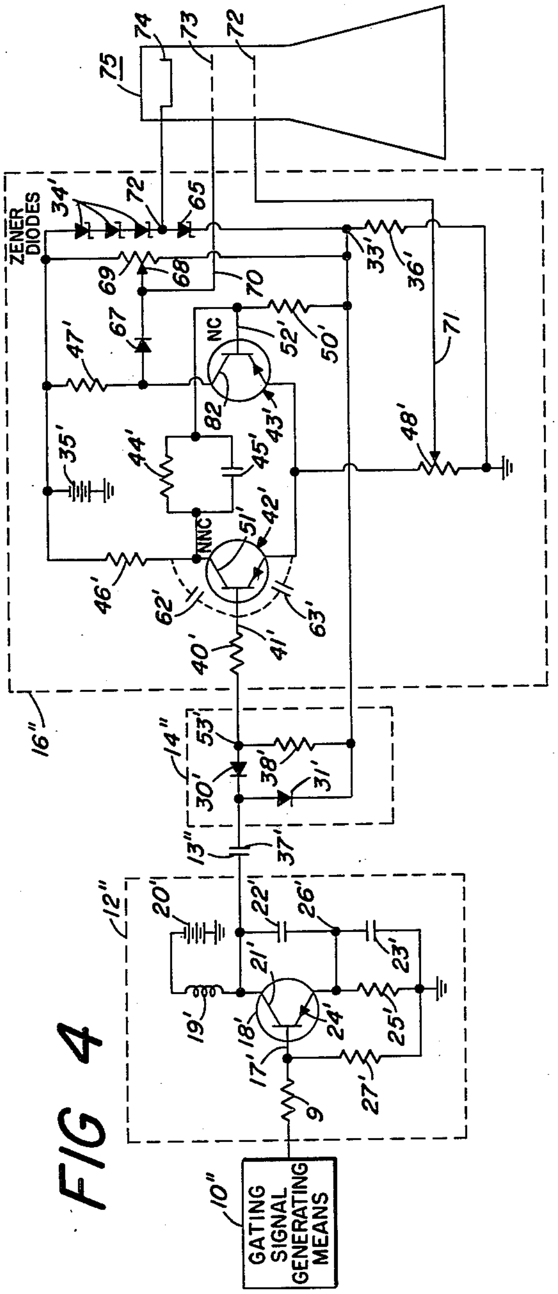
FIG. 4 shows a schematic diagram of the invention as applied to a cathode ray tube.

Referring now to FIG. 4, there is shown a modification of the circuit of FIG. 1 with the actual connections to the various electrodes of a cathode ray tube 75 shown. The elements of FIG. 4, which have corresponding elements in the circuit of FIG. 2, are identified by the same reference characters, although primed.

The principal differences between the structures of FIG.

2 and FIG. 4 are that in FIG. 4 provisions are made to supply the cathode biasing voltage and the focusing grid biasing voltage, as well as the control grid biasing voltage. In addition, the control grid biasing voltage is extracted from the Schmitt trigger circuit in a slightly different manner than that shown in FIG. 2. More specifically, in the circuit of FIG. 4, the control grid biasing potential is extracted from the collector electrode of the transistor 43' through a diode 67 and the lead 70. The diode 67 has its anode connected to the collector 82 of the transistor 43' and its cathode connected to the resistor 69. The function of the diode 67 and the resistor 69 is to set an upper limit on the potential (in a positive direction) of the control grid 73 of the cathode ray tube; said upper limit being determined by the setting of the tap 68 on the voltage dividing resistor 69. The reason for such upper limit is to limit the intensity of the spot on the tube screen.

An additional Zener diode 65, which is selected to have a breakdown voltage of about 5 volts, is added in series with the Zener diodes 34'. The cathode potential is then extracted from the junction 72 between the Zener diodes 34' and the Zener diode 65 and will have a potential 5 volts negative with respect to the point 33'. Such a 5 volt difference between the point 33' and the cathode 74 of the cathode ray tube 75 is necessary in order to provide the proper bias for the control grid 73. More specifically, there exists, starting from the point 33', a potential drop across the resistor 50' and a potential drop across the base-to-collector junction of the transistor 43', which potential drops are in a negative direction. The magnitude of these potential drops from point 33' to collector 82 is greater than 5 volts. As a result, it is necessary to lower the potential of the cathode 74 by the 5 volt breakdown voltage of the Zener diode 65 in order to place the cathode 74-to-control grid 73 potential in the proper operating range.

In accordance with one preferred form of the invention, the following component values have been found to perform satisfactorily:

| | |
|---|---|
| R9—1K | R48—600K |
| R25—8.2K | R50—4.7K |
| R27—8.2K | R69—250K |
| R36—2.2 megohms | C22—680 $\mu\mu$f. |
| R38—10K | C23—1000 $\mu\mu$f. |
| R40—1.2K | C13—100 $\mu\mu$f. |
| R44—100K | C45—680 $\mu\mu$f. |
| R46—33K | E35——1200 volts |
| R47—33K | E20——15 volts |

D30 and 31—Type 1N276 Manufactured by Transitron Electronics Corporation, a Corporation of Delaware.
Transistors 42 and 32—Type 2N1041 Manufactured by Texas Instruments, Inc., a Corporation of Delaware.

The focusing electrode 72 of the tube 75 is connected by a tap to the resistor 48' and has a potential which is positive with respect to the potential of the cathode 74 or the control grid 73.

Figure 5:
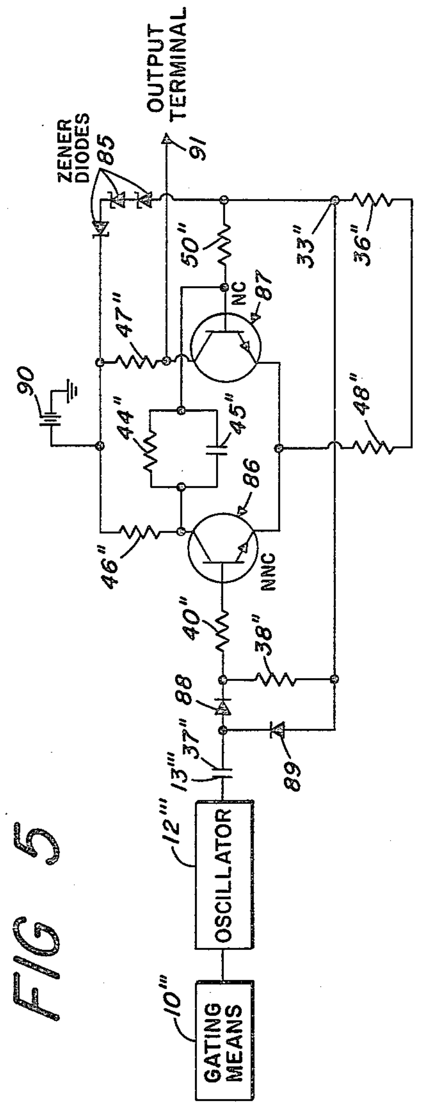
FIG. 5 shows an alternative form of the invention.

Referring now to FIG. 5, there is shown a schematic sketch of an alternative form of the invention. The principal difference between the structure of FIG. 2 and that of FIG. 5 is that in the structure of FIG. 5 NPN type transistors are employed in the trigger circuit rather than PNP type transistors. Pursuant to such change in the type transistors employed, the polarity of the diodes 88 and 89 which correspond to diodes 30 and 31 of FIG. 1, has been changed. In a similar manner, the polarity of the Zener diodes 85, which correspond to the Zener diodes 34 of FIG. 1, and the polarity of battery source 90, which corresponds to battery 35 of FIG. 1, have been changed. The over-all result of the structure of FIG. 5 is the control of a relatively large positive voltage source 90. More specifically, the level of the high positive voltage appearing at the output terminal 91 can be switched by means of the structure shown in FIG. 5.

In the operation of the circuit of FIG. 5, a signal from the oscillator 12''' will produce a positive charge in the right-hand plate 37' of capacitor 13''' instead of a negative charge as is produced in the circuits of FIGS. 2 and 4. This positive charge will function to cause a normally nonconductive transistor 86 to become conductive. As in the case of FIG. 2, the Zener diodes form a dual function of maintaining the potential of the point 33'' constant with respect to the battery source 90 and at the same time provides a low impedance path from the capacitor 13' to battery source 90 and thence to ground potential.

It is to be understood that the forms of the invention herein shown and described are but preferred embodiments thereof and that various changes may be made in circuit arrangements and the values of circuit components without departing from the spirit or the scope of the invention.

I claim:

1. Means for changing the level of magnitude of a direct potential appearing at a given terminal comprising oscillator means, means for gating the output signal of said oscillator means, detector means having an output terminal, capacitor means for supplying the gated output signal of said oscillator means to said detector means, said detector means constructed to detect the output of said oscillator means and to produce at its output terminal an output signal whose magnitude varies in accordance with the magnitude of the output signal of said oscillator means, direct voltage source means from which said direct potential is derived, impedance means comprising constant voltage drop means for connecting said direct voltage source means to said output terminal of said detector means to bias the said output terminal of said detector means to a potential equal to the potential of said direct voltage source means less the potential drop across said impedance means terminal means, and switching means connected to said direct voltage source means and constructed to be responsive to the output signal of said detector means to switch said direct potential from one level of magnitude to another level of magnitude at said given terminal means.

2. A means in accordance with claim 1 in which said switching means comprises a first impedance path and a second impedance path connected in parallel with each other with respect to said direct voltage source means, said switching means responsive to the magnitude of the signal from said detector means to change the impedance of said first and second impedance paths, said terminal means being positioned along the impedance of one of said impedance paths.

3. A means in accordance with claim 1 in which said switching circuit comprises a trigger circuit, said trigger circuit including a first electron valve and a second electron valve each comprising an electron emitting electrode, an electron control electrode, and an electron collector electrode, first and second impedance means connecting the individual electron collecting electrodes of said first and second electron valves to a first terminal of said direct voltage source means, a common impedance means connecting the electron emitting electrodes of said first and second electron valves to the second terminal of said direct voltage source means, third impedance means connecting the electron collecting electrode of said first electron valve to said electron control electrode of said second electron valve, and connecting means connecting the electron control electrode of said first electron valve to the output terminal of said detector means.

4. A means in accordance with claim 3 in which said detector means comprises a first diode means connected between said capacitor means and said connecting means, the series combination of a second diode means and a fourth impedance means connected across said first diode means and further comprising Zener diode means connected between said first terminal of said direct voltage source means and the junction between said second diode and said fourth impedance means.

5. A means in accordance with claim 4 in which said electron valves are PNP type transistors.

6. A means in accordance with claim 4 in which said electron valves are NPN type transistors.

References Cited in the file of this patent

UNITED STATES PATENTS

| | | |
|---|---|---|
| 2,689,949 | Kalback et al. | Sept. 21, 1954 |
| 2,844,762 | Duryee | July 22, 1958 |

OTHER REFERENCES

Millman and Taub: Pulse and Digital Circuits, McGraw-Hill Book Co. (1956), page 171.